3,265,603
PROCESS FOR THE CHLORINATION OF 2-CHLORO-6-NITRO-BENZONITRILE
Franciscus J. F. van der Plas, Amsterdam, Netherlands, assignor to Shell Oil Company, New York, N.Y., a corporation of Delaware
No Drawing. Filed Sept. 6, 1963, Ser. No. 307,035
Claims priority, application Netherlands, Sept. 25, 1962, 283,614
5 Claims. (Cl. 204—158)

This invention relates to a process for the manufacture of 2,6-dichlorobenzonitrile.

2,6-dichlorobenzonitrile is a very useful herbicide, so that it is desirable that there be available at least one process for its preparation which can be readily practiced on a large scale. To be practically useful, such a process must begin with readily available low-cost materials which are readily converted to the desired nitrile. One class of starting materials which is available at reasonable cost in sufficient quantity for large-scale production of 2,6-dichlorobenzonitrile is 2,3-dichloronitrobenzene. This is readily converted to the corresponding 2-chloro-6-nitro-benzonitrile by the process shown in British Patent No. 861,898, and according to the process of the present invention, 2-chloro-6-nitrobenzonitrile is readily converted to 2,6-dichlorobenzonitrile.

According to this invention, it has been found, surprisingly, that 2-chloro-6-nitrobenzonitrile is readily converted to 2,6-dichlorobenzonitrile by reaction with hydrogen chloride, chlorine replacing the nitro group. This is surprising because the hydrogen chloride plays the role of a clorinating agent despite the fact that it has completely different chemical properties from the usual chlorinating agents—in fact, hydrogen chloride ordinarily is a by-product from many chlorination processes.

In more formal terms, the invention provides a process for preparing 2,6-dichlorobenzonitrile which comprises contacting 2-chloro-6-nitrobenzonitrile with hydrogen chloride.

The process is conducted by intimately contacting the nitrile reactant with the hydrogen chloride. The reaction can be conducted in the gas phase (as by conducting the reaction under reduced pressure to permit the nitrile reactant to be in the gas phase), or it can be conducted in the liquid phase (by the use of suitable superatmospheric pressures to maintain the hydrogen chloride liquid). However, because of ease of operation, it is preferred to conduct the reaction under conditions such that the nitrile reactant is in the liquid phase and the hydrogen chloride is gaseous. Thus, gaseous hydrogen chloride can be mixed with molten 2-chloro-6-nitrobenzonitrile, or the nitrile may be dissolved in a suitable solvent to provide a fluid reaction mixture. Suitable solvents include aromatic hydrocarbons, such as benzene, toluene or xylene, halogenated (particularly chlorinated) hydrocarbons, such as carbon tetrachloride, 1,2-dichloroethane or chlorinated benzenes. Particularly suitable because of their physical characteristics, which permit ready recovery of the nitrile product by distillation, are o-dichlorobenzene and 1,2,3-trichlorobenzene. The amount of solvent should of course be sufficient to dissolve the 2-chloro-6-nitrobenzene. However, in some cases it may be found desirable to merely disperse the nitrile reactant in the liquid reaction medium, in which case the liquid reaction medium may be one in which the nitrile reactant is insoluble, or only slightly soluble, or an amount of a solvent for the nitrile reactant that is insufficient to dissolve all of the nitrile reactant, can be used. The criterion in each case is the provision of a readily fluid reaction mixture.

Hydrogen chloride per se can be used, or it may be diluted with an inert gas, such as nitrogen. It has been found, however, that the presence of certain other materials in the reaction mixture, at least at the outset, markedly increases the efficiency of the reaction. These materials, which apparently act as catalysts, or at least as initiators, include those materials conventionally used as chlorinating agents for aromatic compounds, and oxidizing agents for converting hydrogen chloride to chlorine under the reaction conditions. Examples include thionyl chloride, phosphorus pentachloride, nitrosyl chloride, bromine, nitrogen monoxide and nitrogen dioxide. Such materials are used only in catalytic amounts. These quantities are thus considerably smaller than the stoichiometric amount needed for the reaction especially when use is made of chlorinating agents, whether formed in situ or not, which can by themselves effect the replacement of nitro groups by chlorine. It is not quite clear how the said substances influence the reaction according to the invention. Important in this respect probably is that chlorine radicals are formed, either from chlorine molecules that are already present or which are derived from chlorine-yielding compounds or else produced by the oxidation of HCl, or directly from hydrogen chloride by means of radical initiators. These latter radical formers, such as the well-known peroxides and hydroperoxides, which likewise act catalytically in the reaction according to the invention, are preferably added to the reaction mixture itself or to one or more of the liquid components thereof. The catalyst used, for example, chlorine or a radical former which may or may not possess oxidizing properties, should preferably be present at the beginning of the reaction, and if necessary be generated in the course of the reaction in sufficient amounts to maintain the chain reaction. The generation of chlorine radicals may also, of course, be performed in one of the other conventional ways, for example by the action of high-energy radiation, such as by means of ultraviolet light or X-rays. A preeminently suitable catalyst is chlorine.

The above-mentioned catalysts insofar as they are gaseous under the reaction conditions, are preferably added to the hydrogen chloride to be used. They may, however, also be introduced into the reaction mixture separately. Quantities of up to about 0.5 mole per mole of the nitrile reactant usually give very good results. Preferably, not more than 0.3 mole and still more preferably not more than 0.2 mole is used on the same basis. In many cases excellent results are obtained with quantities as small as 0.05 to 0.10 mole of catalyst per mole of nitrile reactant. The presence of the said catalyst has a favorable effect especially at the beginning of the reaction. Once the conversion has started, it is usually preferable to stop further addition thereof entirely, or at least to keep it to a minimum.

The reaction between the 2-chloro-6-nitrobenzonitrile and the hydrogen chloride suitably is conducted at a temperature between 20 and 300° C., with preferred temperatures being 130 and 220° C., and in particular between 160 and 190° C.

It is ordinarily advantageous to employ a considerable excess—for example, from two to six times the theoretical amount of the hydrogen chloride, recycling the hydrogen chloride not consumed in the reaction. An inert gas, for example nitrogen, may be used instead of, or in addition to, the excess hydrogen chloride. All of the hydrogen chloride can be fed into the reaction zone at a single point, or portions of the hydrogen chloride can be fed into the reaction zone at a number of different points.

The reaction is conducted physically in any way which effects intimate contact between the nitrile reactant and the hydrogen chloride. Thus, the reaction can be conducted batchwise, or in a continuous or semicontinuous manner, with the necessary contact being effected by stirring, by use of mixers, centifugal pumps( with or without accompanying closed circulating loops), by means of turbulent flow in pipes (i.e., pipe reactors), by means of packed towers, or by use of other orthodox means for insuring the necessary contact for the necessary period of time.

The reaction (chlorination) preferably is carried out under substantially anhydrous conditions, with any water formed during the chlorination being removed substantially as soon as it has been formed. (Apparently, water is generally formed during the chlorination, probably because of a side reaction between the hydrogen chloride and nitrogen oxides formed during the chlorination.) If the chlorination is carried out as a batch process under reflux conditions, the elimination of water from the reaction mixture may be effected by means of a Dean and Stark apparatus or similar appliance. If, on the other hand, the chlorination is conducted as a continuous process, for example, with the use of a countercurrent method, then the water may easily be removed by the hydrogen chloride effluent stream.

Since side reactions are promoted by the presence of iron and compounds thereof in the reaction mixture, it is important to exclude these substances as far as possible. This should therefore also be taken into account in the choice of construction materials for the apparatus to be employed. Those types of steel which are virtually not attacked under the operating conditions or which are provided with a coat protecting them against corrosion, are suitable, of course. The process is preferably carried out with no iron or compounds thereof present at all. However, very small quantities may be tolerated. The maximum amount is preferably not more than 0.4 milliequivalent of iron or iron compounds per gram mole of the said nitrile reactant.

The efficacy of the process of this invention is demonstrated by the following illustrative example, which shows application of the process of the invention in a particular instance.

*Example I*

The apparatus consisted of a 1-litre flask fitted with a reflux condenser, a gas inlet tube and a stirrer. The reflux condenser was connected, by way of a tube fitted laterally to a Dean and Stark apparatus, whereby the water generated, originating from side reactions, could be removed.

A mixture of 500 grams (2.74 mole) of 6-chloro-2-nitrobenzonitrile and 125 grams of o-dichlorobenzene was heated in the flask to about 160° C. Next, a mixture consisting of 90% (volume basis) of hydrogen chloride and 10% (volume basis) of chlorine was passed through the solution at the rate of 9.1 litres per hour with stirring, the temperature being maintained at 160–180° C. Thus, in all, about 4.1 mole of HCl and about 0.45 mole $Cl_2$ were applied. After cooling, a quantity of aromatic-free benzine with a boiling range of 60–80° C. amounting to double the reactor content was stirred through the reaction mixture. The mixture was subsequently filtered, and then the reaction product washed with aromatic-free benzine and dried.

The yield of raw product thus obtained amounted to 410 grams with a purity of 93%, as determined by infrared analysis. Thus the yield of 2,6-dichlorobenzonitrile amounted to 80% of the theoretical.

I claim as my invention:

1. A process for preparing 2,6-dichlorobenzonitrile, which process comprises admixing 2 - chloro - 6 - nitrobenzonitrile and hydrogen chloride at a temperature of from about 20° C. to 300° C.

2. A process according to claim 1 wherein the admixing is carried out in the presence of from about 0.05 to about 0.5 mole, per mole of said nitrile, of a material of the group consisting of thionyl chloride, phosphorus pentachloride, nitrosyl chloride, bromine, chlorine, nitrogen monoxide and nitrogen dioxide.

3. A process according to claim 1 wherein the admixing is carried out in the presence of a free radical initiator of the group consisting of peroxides, hydroperoxides and high-energy radiation.

4. A process according to claim 1 wherein the admixing is conducted at a temperature of from about 130° C. to about 220° C.

5. A process according to claim 1 wherein the admixing is conducted under substantially anhydrous conditions.

References Cited by the Examiner

UNITED STATES PATENTS

| | | | |
|---|---|---|---|
| 2,010,841 | 8/1935 | Bender | 260—694 X |
| 2,429,031 | 10/1947 | Robinson | 260—694 X |
| 2,459,423 | 1/1949 | Gebhart | 260—649 X |

CHARLES B. PARKER, *Primary Examiner.*

DALE R. MAHANAND, *Assistant Examiner.*